H. E. HOLLEY.
DEMOUNTABLE WHEEL.
APPLICATION FILED JAN. 24, 1918.
1,320,551.
Patented Nov. 4, 1919.
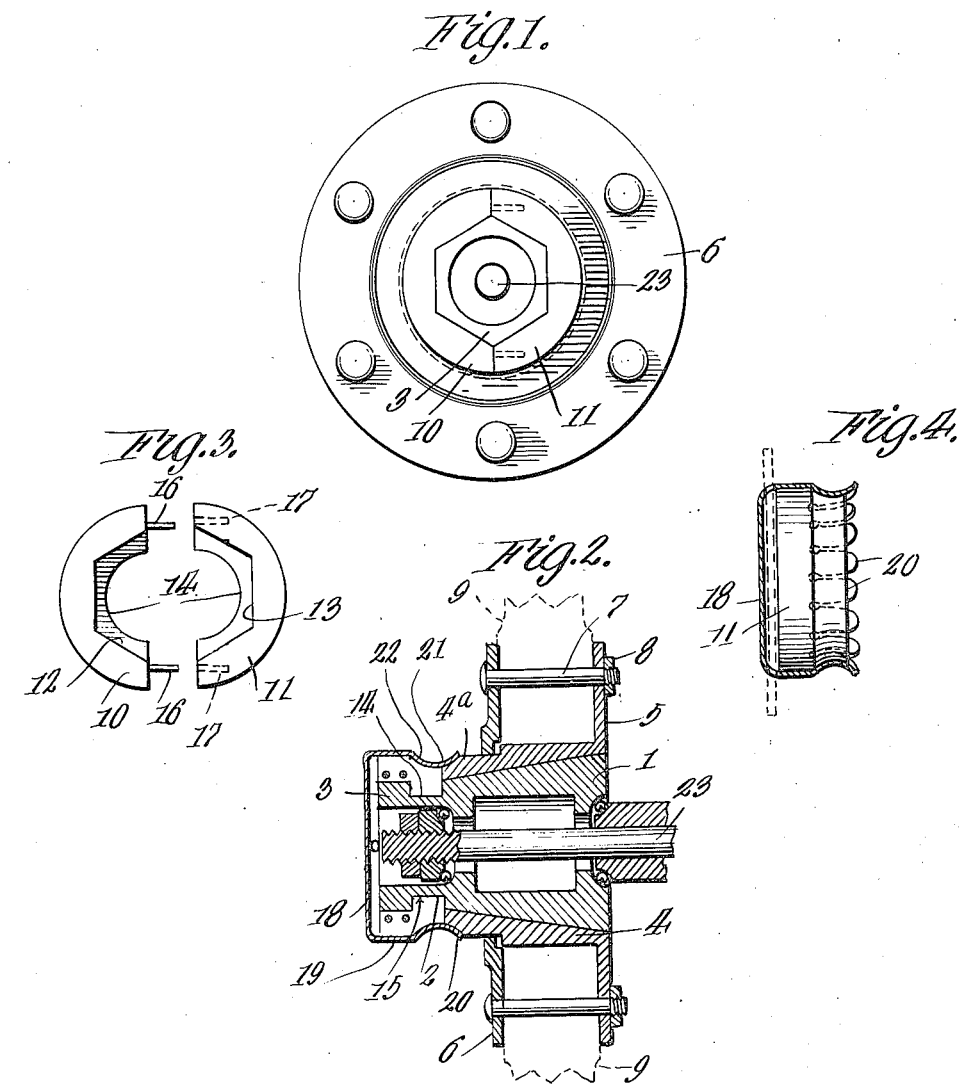
INVENTOR
Henry E. Holley
WITNESSES
Guy M. Spring
H. H. Babcock
BY Richard B. Owen
ATTORNEY

UNITED STATES PATENT OFFICE.

HENRY E. HOLLEY, OF OTISVILLE, NEW YORK.

DEMOUNTABLE WHEEL.

1,320,551.　　　　　Specification of Letters Patent.　　Patented Nov. 4, 1919.

Application filed January 24, 1918. Serial No. 213,555.

*To all whom it may concern:*

Be it known that I, HENRY E. HOLLEY, a citizen of the United States, residing at Otisville, in the county of Orange and State of New York, have invented certain new and useful Improvements in Demountable Wheels, of which the following is a specification.

This invention relates to demountable wheels, and more particularly to a wheel of that type in which the wheel body may be readily removed from, or secured on, the hub.

One of the main objects of the invention is to provide a wheel of the character stated of simple construction and operation which may be produced at relatively small cost. A further object is to provide a wheel of neat appearance in which the parts of the device are arranged to effectually prevent the entry of grit and foreign matter between the hub and the wheel body. Another object is to provide simple and efficient means for securing a wheel body on the hub, this means being adapted to permit ready mounting or demounting of the wheel. Further objects will appear from the detailed description.

In the drawings:
Figure 1 is a front view of the means for securing the wheel body on the hub, the hub cap being removed.

Fig. 2 is a fragmentary central sectional view through the hub portion of a wheel constructed in accordance with my invention.

Fig. 3 is a detail of the securing nut in disassembled condition.

Fig. 4 is a central section through the hub cap as applied to the securing nut, the latter being shown in elevation.

The body 1 of the hub is of frustopyramidal shape, tapering outwardly. This body is provided, at its outer end, with an integral reduced neck 2 having, at its outer end an outwardly projecting annular shoulder which is of polygonal shape to provide, in effect, a hexagonal nut 3. Body 1 receives a hub casing or sleeve 4 which fits snugly thereon, this sleeve being provided at its inner end with an outwardly projecting annular flange 5 which constitutes the inner hub plate. An outer hub plate 6 is mounted on the outer reduced portion 4ª of sleeve
4. This hub plate is secured to hub plate 5 by bolts 7 and nuts 8 threaded thereon, the two hub plates in conjunction with the bolts and nuts coöperating to secure both ends of the spokes 9 in position about the inner portion of casing 4, in the well known manner.

After securing the casing or sleeve 4 on hub body 1, I provide a split or divided nut composed of two sections 10 and 11. These sections are of semi-circular shape and are adapted to fit snugly about the hexagonal nut 3 and neck 2, section 10 being provided in its outer face with a recess 12 adapted to receive one-half of nut 3, the section 11 being provided with a recess 13 to receive the other half of the nut. Each section is further provided, adjacent its inner end, with an annular inwardly directed shoulder 14, this shoulder being adapted to fit snugly within the annular channel 15 formed about neck 2 intermediate nut 3 and body 1 of the hub. Section 10 of the nut is provided, on its inner face and adjacent each end, with two outwardly projecting locking pins 16. These pins are adapted to fit snugly into coöperating recesses 17 provided in section 11. The sections of the securing nut are placed about neck 2 and nut 3 so as to fit snugly over and about the same, the annular shoulder 14 fitting snugly within channel 15, the pins 16 and recesses or bores 17 coöperating to effectually prevent relative movement between the sections of the nut.

To prevent displacement of the sections of the securing nuts, I provide a sheet metal hub cap 18. This hub cap is provided with a depending peripheral flange 19 and corresponds in interior diameter to the exterior diameter of the securing nut. The hub cap is further provided, at its inner end, with a plurality of spaced resilient securing fingers 20 of arcuate shape. These fingers are adapted to fit snugly within an annular arcuate groove formed by the coöperating arcuate grooves 21 and 22 provided at the contiguous ends of the casing 4 and the securing nut, respectively. By forcing the hub cap into position over the securing nut, the securing fingers 20 will engage into this annular arcuate groove so as to releasably secure the cap in position. The body portion of the cap fits snugly about the sections of the securing nut so as to effectually prevent relative movement between the same, outward or axial movement of this nut being prevented by engagement of the shoulders 14 into the annular groove 15. This shoulder 14 also acts as a lock for the casing 4, the outer end of which fits snugly against the inner face of the securing nut when the casing is in proper position on hub body 1. The hub is adapted to receive a shaft or axle 23 which may be secured in the same in any suitable or well known manner, bearing balls or other suitable anti-friction members being interposed between this shaft and the hub, as is usual.

A wheel constructed in this manner may be readily produced at comparatively small cost, and the body of the wheel may be readily removed from or secured on the body of the hub. This permits one or more wheel bodies to be carried by an automobile or vehicle so that, in the event of breakage or serious damage to one of the wheels, in use, this wheel may be removed and a new wheel readily substituted therefor. In addition, the various parts of this wheel may be readily standardized so as to permit it to be made in comparatively large numbers at small cost. It will be evident that there may be slight changes in the construction and arrangement of the different parts of my invention without departing from the field and scope of the same, and I intend to include all such variations as fall within the scope of the appended claims in this application in which a preferred form only of my invention is disclosed.

What I claim is:

1. In a device of the class described, the combination of a hub, a sleeve movably fitting upon said hub, a divided locking nut carried by said hub and bearing upon said sleeve for holding the sleeve in a set position, said nut and sleeve having annular grooves communicating with each other, a hub cap having a peripheral flange provided with resilient fingers, said cap fitting upon said nut to hold the same in place and said fingers fitting within said grooves, thus releasably holding said cap in a set position, and said cap preventing the entry of refuse into the device.

2. In a device of the class described, the combination of a hub, a sleeve movably fitting upon said hub, locking means carried by said hub and bearing upon said sleeve for holding the sleeve against displacement, said locking means and sleeve having annular grooves communicating with each other, a hub cap provided with a flange provided with resilient fingers, said cap fitting upon said locking means to hold the same in position and said fingers fitting within said grooves, thus releasably holding the cap in a set position and said cap permitting the entry of refuse into the device.

3. In a device of the class described, the combination of a hub, a sleeve movably fitting upon said hub, a divided locking nut carried by said hub and bearing upon said sleeve for holding the sleeve against displacement, a hub cap having a peripheral flange provided with resilient pieces, said cap resting upon said nut to hold the same in place and said fingers engaging said nut and sleeve, whereby said cap is releasably held in a set position, and said cap preventing the entry of refuse into the device.

4. In a device of the class described, the combination of a hub, a sleeve removably fitting upon said hub, a locking nut carried by said hub and bearing upon said sleeve for holding a sleeve in a set position, said nut and sleeve having annular grooves communicating with each other, a hub cap having a peripheral flange provided with resilient fingers, said cap fitting upon said nut to hold the same in place, said fingers fitting within said grooves, thus releasably holding said cap in a set position, and said cap preventing the entry of refuse into the device.

5. In a device of the class described, the combination of a hub, a sleeve movably fitting upon said hub, a locking nut carried by said hub and bearing upon said sleeve for holding the sleeve in a set position, said nut and sleeve having annular grooves communicating with each other, a hub cap having resilient fingers, said cap fitting upon said nut to hold the same in place and said fingers fitting within said grooves, thus releasably holding said cap in a set position and said cap preventing the entry of refuse into the device.

6. In a device of the class described, the combination of a hub, a sleeve movably fitting upon said hub, locking means carried by said hub and bearing upon said sleeve for holding the sleeve against displacement, said locking means and said sleeve having annular grooves communicating with each other, a hub cap provided with resilient fingers, said cap fitting upon said locking means to hold the same in position, and said fingers fitting within said grooves, thus releasably holding the cap in a set position and said cap preventing the entry of refuse into the device.

7. In a device of the class described, the combination of a hub, a sleeve movably fitting upon said hub, a locking nut carried by said hub and bearing upon said sleeve for holding the sleeve against displacement, a hub cap having a peripheral flange provided with resilient fingers, said cap resting upon said nut to hold the same in place, said fingers engaging said nut and sleeve, whereby said cap is releasably held in a set position and said cap preventing the entry of refuse into the device.

8. In a device of the class described, the combination of a hub, a sleeve removably fitting upon said hub, locking means carried by said hub and bearing upon said sleeve for holding the sleeve against displacement, a hub cap provided with a flange having resilient fingers, said cap fitting upon said locking means to hold the same in position and said fingers engaging said nut and sleeve whereby said cap is releasably held in a set position, and said cap preventing the entry of refuse into the device.

9. In a device of the class described, the combination of a hub, a sleeve movably fitting upon said hub, locking means carried by said hub and bearing upon said sleeve for holding the sleeve against displacement, a cup-like hub cap provided with resilient fingers extending at substantially right angles to the body of the cap, said cap fitting upon said locking means to hold the said locking means in position, and fingers engaging said sleeve whereby said cap is releasably held in a set position, and said cap preventing the entry of refuse into the device.

In testimony whereof I affix my signature in presence of two witnesses.

HENRY E. HOLLEY.

Witnesses:
FRED BAILEY,
HAROLD L. BENTON.